United States Patent [19]

Knauss

[11] 4,385,846
[45] May 31, 1983

[54] AXIAL-BEARING ARRANGEMENT ON SHAFTS, IN PARTICULAR IN SPEED-CHANGE GEARS OF MOTOR VEHICLES

[75] Inventor: Timotheus Knauss, Mannheim, Fed. Rep. of Germany

[73] Assignee: General Motors Corporation, Detroit, Mich.

[21] Appl. No.: 323,419

[22] Filed: Nov. 20, 1981

[30] Foreign Application Priority Data

Mar. 11, 1981 [DE] Fed. Rep. of Germany ... 8106874[U]

[51] Int. Cl.³ .............................................. F16C 17/04
[52] U.S. Cl. ............................. 384/420; 308/DIG. 11
[58] Field of Search ............... 308/135, 163, DIG. 11, 308/161, 237 A, 165; 411/516, 517, 518, 519; 464/4; 384/303, 420, 424, 425

[56] References Cited

U.S. PATENT DOCUMENTS

| | | | |
|---|---|---|---|
| 1,937,965 | 12/1933 | Johnson | 308/135 |
| 2,420,921 | 5/1947 | Waldes | 308/135 X |
| 3,194,615 | 7/1965 | Weasler | 308/135 X |
| 3,674,325 | 7/1972 | Moroney et al. | 308/163 X |

FOREIGN PATENT DOCUMENTS 947273  8/1956  Fed. Rep. of Germany ...... 411/517

Primary Examiner—Stuart S. Levy
Assistant Examiner—David Werner
Attorney, Agent, or Firm—Donald F. Scherer

[57] ABSTRACT

An axial thrust bearing arrangement for a shaft has a two-piece thrust ring comprised of substantially semiannular portions. Each semiannular portion has one end structure projecting radially inward and engaging a recess in the shaft. An outer ring encircles the semiannular portion to prevent movement radially outward. Each end structure has a relief or undercut area adjacent the annular portion to provide clearance with the shaft surface adjacent the recess.

1 Claim, 3 Drawing Figures

AXIAL-BEARING ARRANGEMENT ON SHAFTS, IN PARTICULAR IN SPEED-CHANGE GEARS OF MOTOR VEHICLES

The innovation pertains to an axial-bearing arrangement on shafts, in particular in speed-change gears of motor vehicles, consisting of a thrust ring of two or more parts by radial division, inserted in an annular slot, the individual ring elements of which are held together by a closed external ring, and in which the ring elements are insured against rotation in the circumferential direction by virtue of radially inward-directed projections that engage in corresponding recesses in the shaft.

In the case of conventional single-section retaining rings that fill almost the entire circumference of the annular slot in which they are inserted and which, consequently, can be inserted into this slot only under appropriate elastic deformation, one is familiar with the provision of inward- or outward-projecting tongues in accordance with the utilization as a retaining element on a shaft or in a bore for the purpose of expansion of the contact surfaces.

Since these tongues, according to the particular case, are situated on the gripping surface or the side away from the slot, they are not intended, and are also not in a position to act as protection against rotation of the retaining ring in the circumferential direction. Protection against rotation, in this case, is effected strictly by virtue of the tensional force of the retaining ring seated in the slot with radial pretension.

As a consequence of the work of deformation required for the insertion in the slot, and because of the radial pretension required after insertion of the retaining ring, these retaining rings are subject to limits on the basis of their size in their application, with the consequence that in the case of larger diameters and/or larger axial forces that the retaining rings must withstand, they must be executed in two or more sections in the circumferential direction. Because of the lacking radial pretension, these retaining rings or their individual elements must each be provided with a radially extending projection that engages in a corresponding recess in the base of the slot in order, in this manner, to protect the retaining ring against rotation in the circumferential direction.

Such two-section retaining rings that are inserted in slots in the shaft are known in speed-change gears of motor vehicles. There they have the task of absorbing axial forces produced by the helical cut of the gears, by shifting forces, or by vibrations. In each case, the radially inward-projecting projection is in the center of the two individual elements of the retaining ring.

In the area of the transition between the projection and the foundation of the ring element, for the purposes of reduction of the notching effect and for reasons relating to production, provision is made for a relief or undercut with a relatively large radius of curvature with, at the same time, a deep cut into the annular foundation. Associated with this is a weakening of the ring cross-section exactly at the site that is most highly stressed in the case of unfavorable stress relationships to which a ring element is exposed in the case of the presence of play in the slot and in the case of punctually-attacking axial forces at the associated end of the semi-ring.

It has been seen that a flaw or fracture always occurs at this site or emanating from this site. The previously mentioned reduction of the ring cross-section can of course easily be compensated by means of correspondingly generous dimensioning of the thrust ring or retaining ring. However, this would mean not only an increase in weight, but also would lead to a noticeable lengthening of the transmission. In the interest of optimization of a compact transmission, in particular concerning the length, the thrust discs are made as thin as possible.

The problem of the innovation, therefore, is to modify the known thrust discs in such a way that the dangerous peaks of stress in the region of the transition from the projection to the body of the ring are eliminated or reduced in order that, thereby, either the danger of fracture can be eliminated at a given thickness or the weight or thickness can be critically reduced in the direction of an optimization of a compact transmission.

In accordance with the innovation, this problem is solved by virtue of the fact that the projections, in each case, are situated on one end of the individual ring elements of the thrust ring.

By virtue of this, the most highly stressed cross section in the center of the ring element is subject to no reduction by the unavoidable relief that is now displaceable to the edge, in the region of the transition between the projection and the foundation of the ring element. The cross section that is reduced due to the relief is thus removed from the field of stress between the center of the ring and the end sections and is thus relieved of load. The forces acting on the projection toward a rotation of the thrust ring are comparatively small and represent in no way a danger of fracture for the cross section in the area of the relief.

With respect to the relatively small forces on the projections in the circumferential direction, in accordance with a further characteristic of the innovation, the suggestion is made that provision be made for projection on only one ring element of the two or more part thrust ring.

A further important characteristic of the innovation lies in the fact that the projections have a rectangular cross section and, in the circumferential direction, have such an extent that, with their edges, they are in contact with the walls of the recesses in the shaft, which are configured as bores.

In this way, the projections engage in the recesses without play so that in the case of a reversal of the circumferential direction, the protection against rotation immediately becomes effective and, in no way, is it possible for there to be a free rotational angle of the thrust ring.

In the production of the recesses as bores, it is unavoidable that the bores project laterally beyond the edge of the groove. However, since in no case are more than two projections required for the protection of the thrust ring against rotation, the shortening of the usable contact surface of the thrust ring is without significance, especially since, in any case, in the region of the projections, without regard to the relief, the thrust ring cannot be fully utilized for absorbing axial forces.

A more detailed embodiment of the present invention is set forth in the following description and drawings in which.

Figure 1:
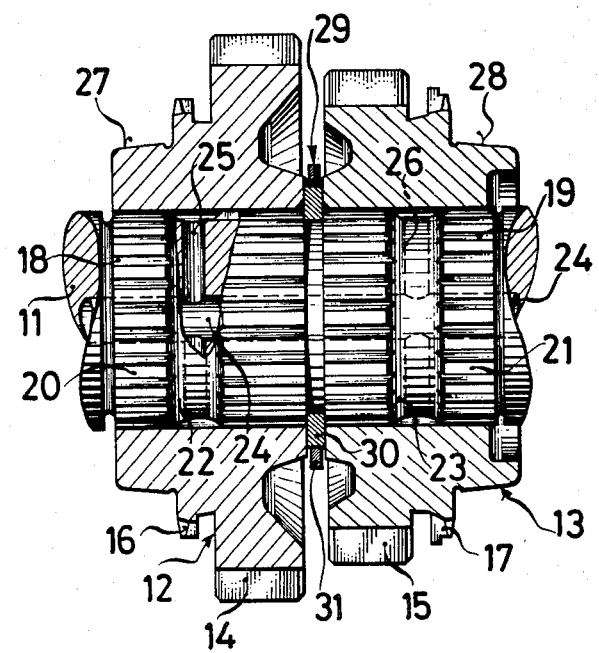
FIG. 1 is a section of the speed-change gear of a motor vehicle.
Figure 2:
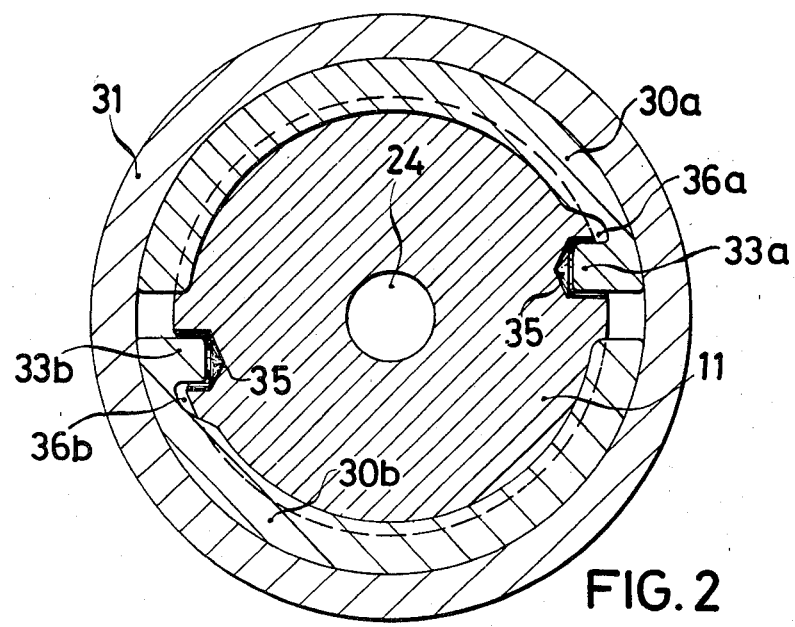
FIG. 2 is an axial view of an incorporated axial-bearing arrangement running between two gears on a shaft, in accordance with the innovation.
Figure 3:
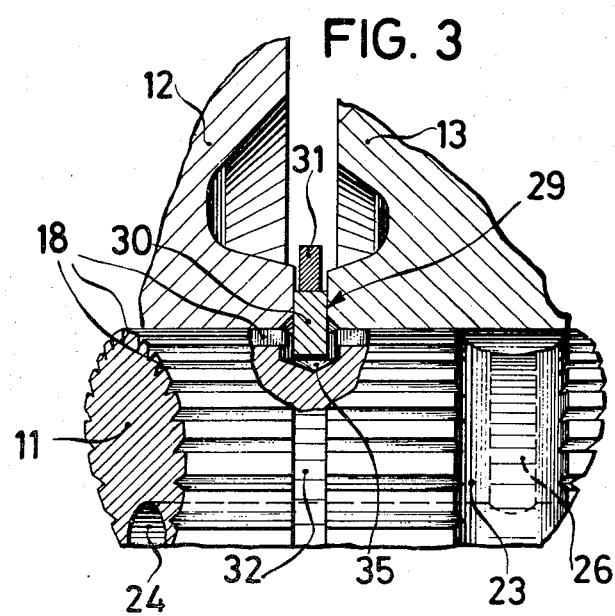
FIG. 3 is an axial section through the shaft in the plane of the projection of the thrust ring of the axial-bearing arrangement at enlarged scale.

In FIG. 1, the gears 12 and 13 freely rotatable on the main shaft 11 of a transmission of a motor vehicle are, in each case, equipped with a toothing 14 and 15 for engagement with the toothings of the gears situated on another shaft and are each equipped with a coupling ring gear 16 and 17.

In the area of the two gears 12 and 13, the diameter of the main shaft 11 is the same. The contact surfaces 20 and 21 of the main shaft 11 provided with longitudinal slots 18 and 19 are in each case interrupted by a flat annular slot 22, 23, into which, in each case, there opens a cross bore 25, 26. Starting from a central longitudinal bore 24, the contact surfaces 20, 21 are supplied with lubricating oil through these bores.

The transmission gears 12, 13 have helical toothing, so that they produce an axial force increasing with the load. Axial forces are also produced by the associated shifting forces that become effective through the associated contact cones 27, 28 of two synchronization devices (not shown) situated to either side. For the acceptance of axial forces, between the gears 12 and 13, in either direction, there is situated an axial bearing arrangement 29 consisting of a two-section thrust ring 30 with ring halves 30a and 30b and a closed outer ring 31.

The thrust ring is seated in a slot 32 of the main shaft 11. The ring halves 30a, 30b are held together by external ring 31 against the centrifugal forces that appear upon rotation of shaft 11. The external ring 31 is narrower than the thrust ring 30, so that gears 12, 13 are in contact strictly with the thrust ring 30.

For protection against rotation in the circumferential direction, the two ring halves 30a and 30b are each equipped with a projection 33a and 33b, which project into a radial bore 35 of the main shaft 11.

In accordance with the innovation, the projections 33 and 34 are each situated at one end of the semi-ring 30a or 30b of the thrust ring 30. At the overhang between the foundation of the semi-rings 30a and 30b and the projections 33 and 34, provision is made for a relief or undercut 36a, 36b for the purposes of reduction of the notch angle and for reasons relating to production. The diameter bore 35 is adjusted to the extension of the projections 33a and 33b in the circumferential direction in such a way that the latter engage in bores 35 largely without play.

On the basis of the arrangements of the projections 33a and 33b in accordance with the innovation, it is possible to configure the thrust rings very thin without danger of fracture, so that in addition to savings in weight, most especially, a noticeable reduction is achieved in the length of the shaft and transmission in the direction of an optimization of a compact transmission.

The embodiments of the invention in which an exclusive property or privilege is claimed are defined as follows:

1. A longitudinal thrust bearing arrangement for a shaft of a change-speed gearing of a motor vehicle, said thrust bearing comprising an annular groove in the shaft, a two-part ring which is inserted in said annular groove and of which the individual ring parts are held together by a closed outer ring narrower axially than said ring parts, and the ring parts are secured against rotation in peripheral direction by lugs which are directed radially inwardly and engage in corresponding cavities in the shaft, each of the lugs are arranged at one end only of the respective individual ring parts.

* * * * *